United States Patent
Johnson

[11] Patent Number: 5,561,937
[45] Date of Patent: Oct. 8, 1996

[54] FISHING ROD HOLDER

[76] Inventor: William E. Johnson, 43701 Bear Lake Blvd., DeLand, Fla. 32720

[21] Appl. No.: 529,326

[22] Filed: Sep. 18, 1995

[51] Int. Cl.⁶ .................................................. A01K 97/10
[52] U.S. Cl. ........................... 43/21.2; 248/534; 248/538
[58] Field of Search ........................... 43/21.2; 248/534, 248/535, 538, 214, 230.8, 228.8, 511, 518

[56] References Cited

U.S. PATENT DOCUMENTS

| | | | |
|---|---|---|---|
| 1,786,254 | 12/1930 | Meehan | 248/534 |
| 2,399,435 | 4/1946 | Gregory | 248/538 |
| 2,443,762 | 6/1948 | Boal | 248/538 |
| 2,803,387 | 8/1957 | Pearce | 43/21.2 |
| 3,184,192 | 5/1965 | Hoerr | 248/538 |
| 4,198,775 | 4/1980 | Leisner | 43/21.2 |
| 4,517,761 | 5/1985 | Bleggi | 43/21.2 |
| 5,152,494 | 10/1992 | Frunzar | 248/538 |
| 5,163,652 | 11/1992 | King | 248/538 |
| 5,210,971 | 5/1993 | Efantis | 43/21.2 |
| 5,214,874 | 6/1993 | Faulkner | 43/25.2 |
| 5,247,759 | 9/1993 | Noriega | 43/21.2 |
| 5,312,077 | 5/1994 | Gvtierrez | 248/214 |

Primary Examiner—Joseph J. Hail, III
Assistant Examiner—Darren Ark

[57] ABSTRACT

A fishing rod holder comprised of an elongated hollow pole having a slot formed through a lower surface thereof. A triangular support brace having an elongated recess formed therein is dimensioned to receive the elongated hollow pole therein. The triangular support brace is positionable atop a bridge rail for securement thereto. A strap is received though the slot in the elongated hollow pole and extending outwardly of an open end thereof and wrapped under the bridge rail and triangular support brace to be coupled with a securement buckle on a distal end of the strap.

5 Claims, 3 Drawing Sheets

FISHING ROD HOLDER

BACKGROUND OF THE INVENTION

1. Field of the Invention

The present invention relates to a fishing rod holder and more particularly pertains to holding a fishing rod in place against a bridge rail with a fishing rod holder.

2. Description of the Prior Art

The use of fishing pole holders is known in the prior art. More specifically, fishing pole holders heretofore devised and utilized for the purpose of adapting to hold fishing poles are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,312,077 to Gutierrez discloses a mounting device.

U.S. Pat. No. 5,247,759 to Noriega discloses a fishing rod holder.

U.S. Pat. No. 5,214,874 to Faulkner discloses a holder for fishing rod or the like.

U.S. Pat. No. 5,210,971 to Efantis discloses a fishing rod holder.

U.S. Pat. No. 5,163,652 to King discloses a clamp and rod holder assembly.

U.S. Pat. No. 4,517,761 to Bleggi discloses a boat railing mounted fishing rod holder.

While these devices fulfill their respective, particular objective and requirements, the aforementioned patents do not describe a fishing rod holder for holding a fishing rod in place against a bridge rail.

In this respect, the fishing rod holder according to the present invention substantially departs from the conventional concepts and designs of the prior art, and in doing so provides an apparatus primarily developed for the purpose of holding a fishing rod in place against a bridge rail.

Therefore, it can be appreciated that there exists a continuing need for a new and improved fishing rod holder which can be used for holding a fishing rod in place against a bridge rail. In this regard, the present invention substantially fulfills this need.

SUMMARY OF THE INVENTION

In view of the foregoing disadvantages inherent in the known types of fishing pole holders now present in the prior art, the present invention provides an improved fishing rod holder. As such, the general purpose of the present invention, which will be described subsequently in greater detail, is to provide a new and improved fishing rod holder and method which has all the advantages of the prior art and none of the disadvantages.

To attain this, the present invention essentially comprises an elongated hollow pole having an open first end, an open second end, and an intermediate extent therebetween. The intermediate extent has a slot formed through a lower surface thereof. The device includes a triangular support brace having a first side, a second side, and a third side. The first side has an elongated recess formed therein. The elongated recess is dimensioned to receive the elongated hollow pole therein. The second side has an obtuse recess formed therein. The obtuse recess has a rubber liner secured therein. The second side is positionable atop a bridge rail for securement thereto. The device includes a strap having a first end, a second end, and an intermediate extent therebetween. The second end has a securement buckle secured thereto. The first end is received though the slot in the elongated hollow pole and extending outwardly of the open second end thereof and wrapped under the bridge rail and triangular support brace to be coupled with the securement buckle in front of the second side of the triangular support brace. A pair of threaded screws extend through the intermediate extent of the strap and through the intermediate extent of the lower surface of the elongated hollow pole for securement to the first side of the triangular support brace. The intermediate extent of the strap has a securement button secured thereto at a position outwardly of the open second end of the elongated hollow pole. An accessory pouch is adapted to be secured to the securement button of the strap.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fishing rod holder which has all the advantages of the prior art fishing pole holders and none of the disadvantages.

It is another object of the present invention to provide a new and improved fishing rod holder which may be easily and efficiently manufactured and marketed.

It is a further object of the present invention to provide a new and improved fishing rod holder which is of durable and reliable construction.

An even further object of the present invention is to provide a new and improved fishing rod holder which is susceptible of a low cost of manufacture with regard to both materials and labor, and which accordingly is then susceptible of low prices of sale to the consuming public, thereby making such a fishing rod holder economically available to the buying public.

Still yet another object of the present invention is to provide a new and improved fishing rod holder which provides in the apparatuses and methods of the prior art some of the advantages thereof, while simultaneously overcoming some of the disadvantages normally associated therewith.

Even still another object of the present invention is to provide a new and improved fishing rod holder for holding a fishing rod in place against a bridge rail.

Lastly, it is an object of the present invention to provide a new and improved fishing rod holder comprised of an elongated hollow pole having a slot formed through a lower surface thereof. A triangular support brace having an elongated recess formed therein is dimensioned to receive the elongated hollow pole therein. The triangular support brace is positionable atop a bridge rail for securement thereto. A strap is received though the slot in the elongated hollow pole and extending outwardly of an open end thereof and wrapped under the bridge rail and triangular support brace to be coupled with a securement buckle on a distal end of the strap.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
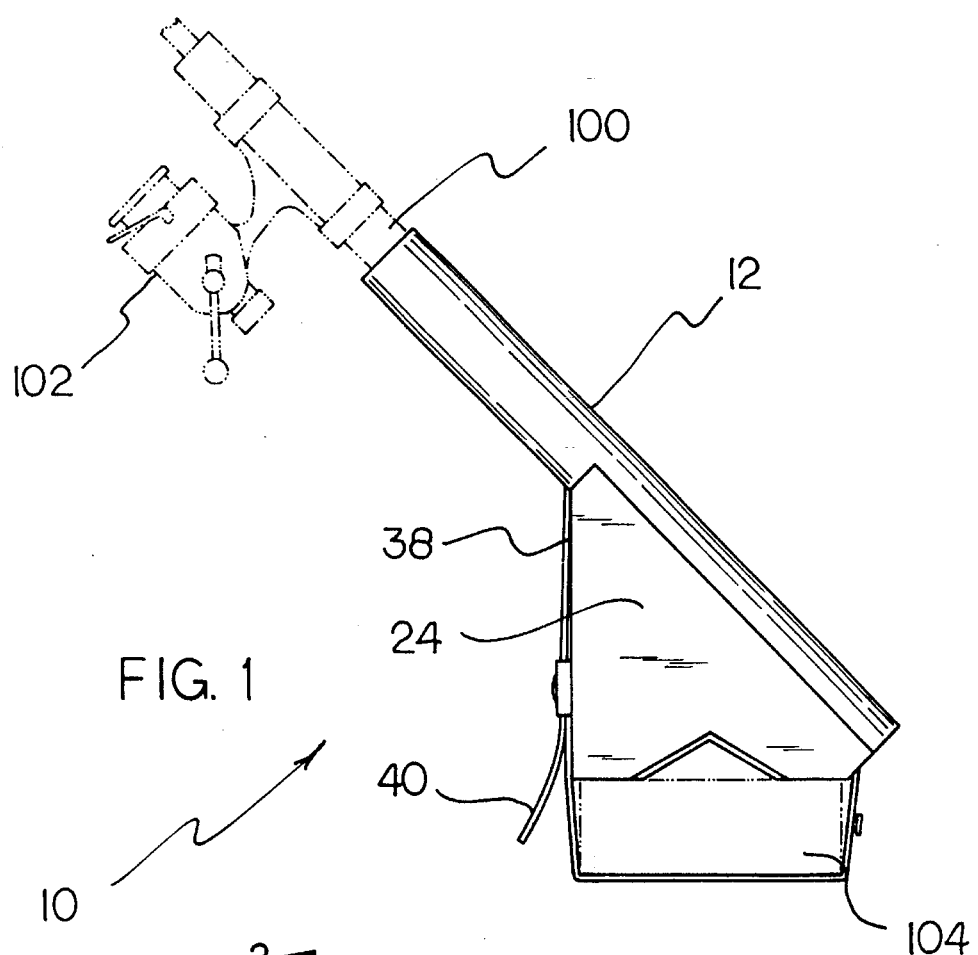
FIG. 1 is a side view of the preferred embodiment of the fishing rod holder constructed in accordance with the principles of the present invention.
Figure 2:
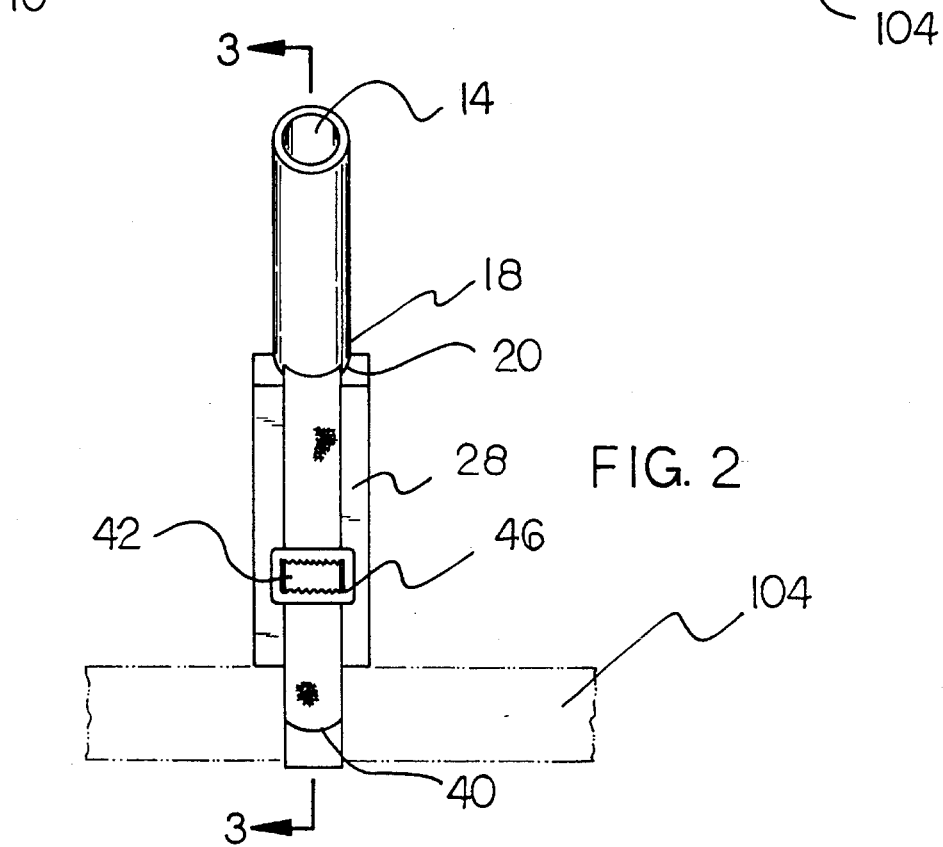
FIG. 2 is a front elevation view of the present invention.

With reference now to the drawings, and in particular, to FIGS. 1–6 thereof, the preferred embodiment of the new and improved fishing rod holder embodying the principles and concepts of the present invention and generally designated by the reference number 10 will be described.

Specifically, it will be noted in the various Figures that the device relates to a new and improved fishing rod holder for holding a fishing rod in place against a bridge rail. In its broadest context, the device consists of an elongated hollow pole, a triangular support brace, a strap, and an accessory pouch. Such components are individually configured and correlated with respect to each other so as to attain the desired objective.

The device 10 includes an elongated hollow pole 12 having an open first end 14, an open second end 16, and an intermediate extent 18 therebetween. The intermediate extent 18 has a slot formed 20 through a lower surface thereof. The open first end 14 is adapted to receive a fishing rod handle 100 therein. A reel 102 from the fishing rod will prevent the fishing rod from falling through the elongated hollow pole 12. The hollow pole 12 is preferable twelve inches in length and having a diameter of about 1¼ inches. See FIG. 1. The preferable construction of the hollow pole 12 is of a PVC pipe.

Figure 3:
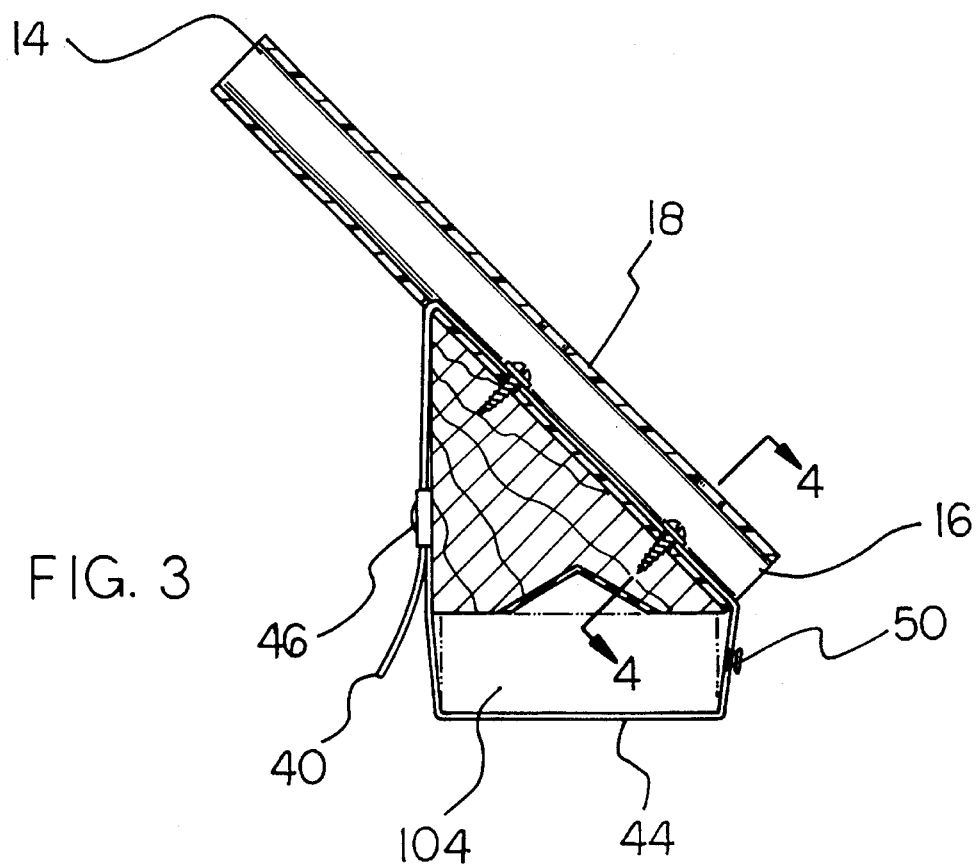
FIG. 3 is a cross-sectional view of the present invention as taken along line 3—3 of FIG. 2.

Next included in the device 10 is a triangular support brace 24 having a first side 26, a second side 28, and a third side 30. The first side 26 has an elongated recess 32 formed therein. The elongated recess 32 is dimensioned to receive the elongated hollow pole 12 therein. The third side 30 has an obtuse recess 34 formed therein. The obtuse recess 34 has a rubber liner 36 secured therein. The third side 30 is positionable atop a bridge rail 104 for securement thereto. The obtuse recess 34, best illustrated in FIG. 3, is provided for the triangular support brace to be secured to a rounded rail 106. An illustration of such a securement is best viewed in FIG. 6.

Figure 4:
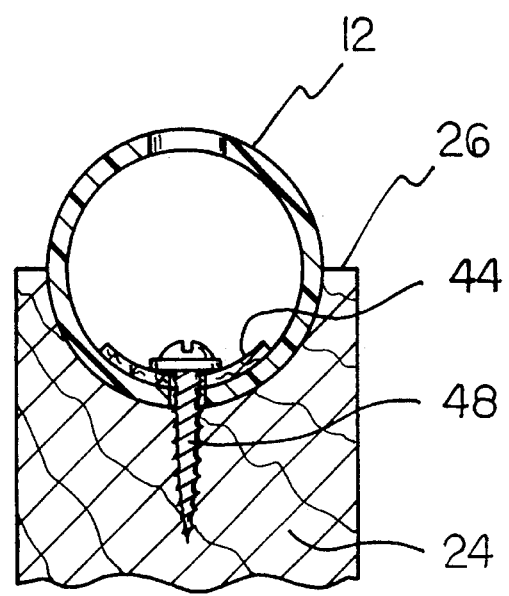
FIG. 4 is a cross-sectional view as taken along line 4—4 of FIG. 3.
Figure 5:
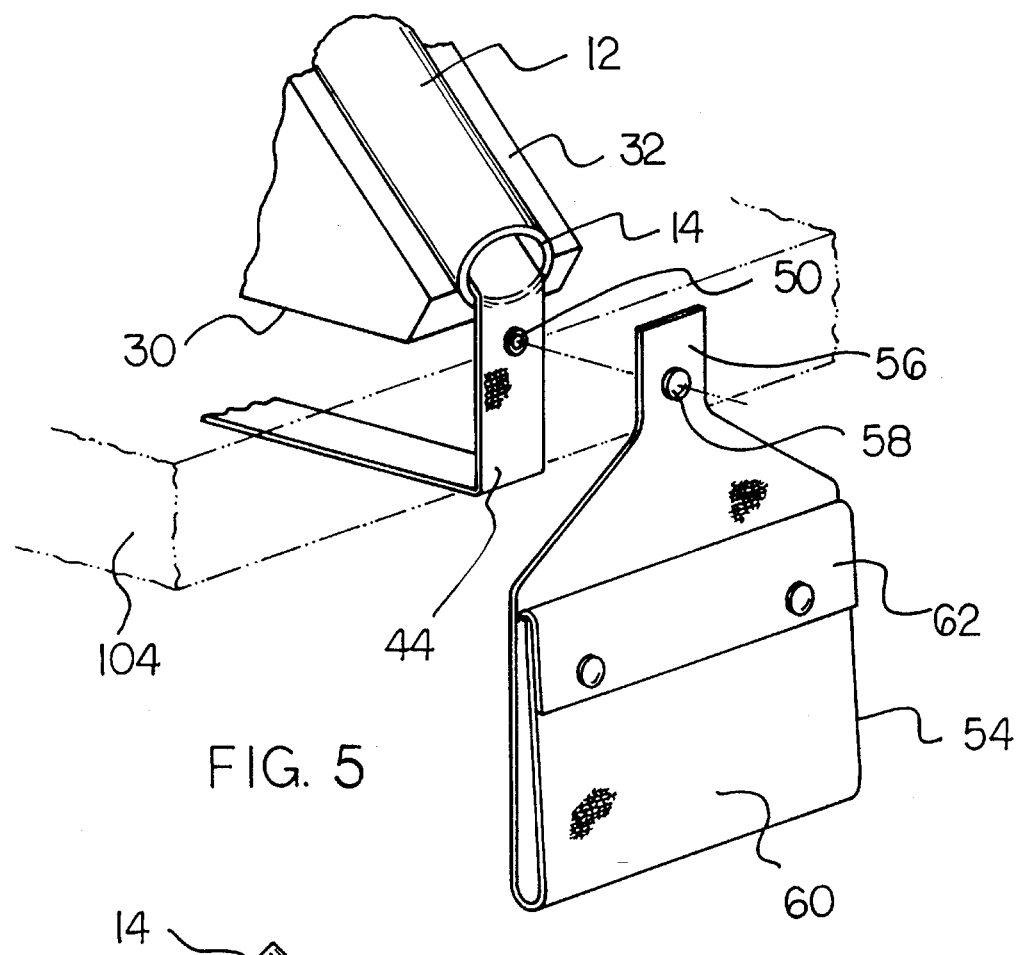
FIG. 5 is a perspective view of the accessory pouch of the present invention.
Figure 6:
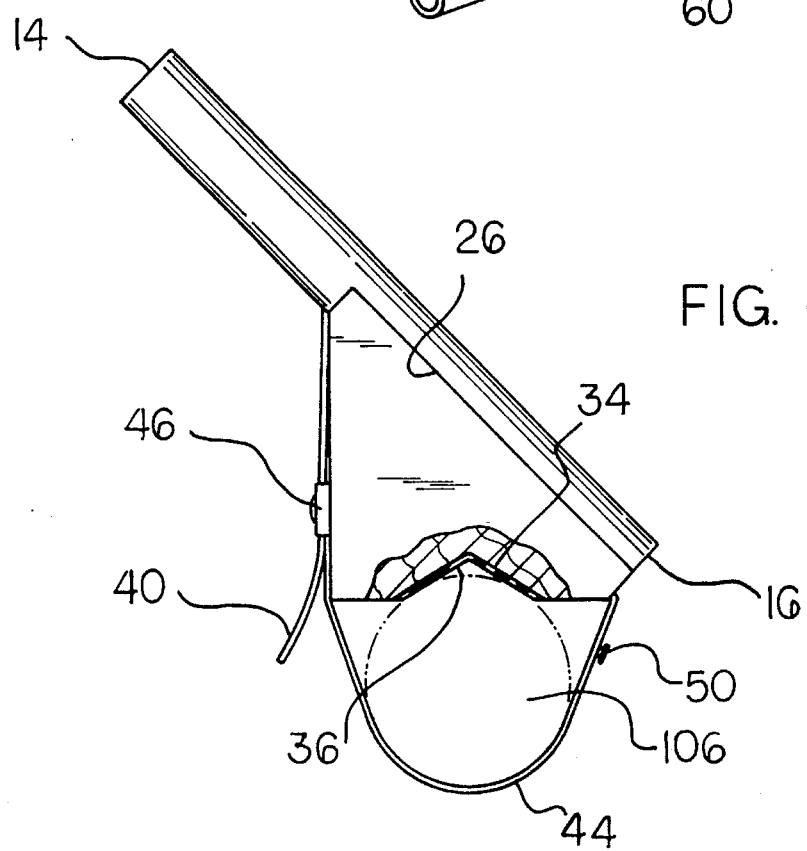
FIG. 6 is a side elevation view of the present invention secured to a round railing.

The device 10 further includes a strap 38 having a first end 40, a second end 42, and an intermediate extent 44 therebetween. The second end 42 has a securement buckle 46 secured thereto. The first end 40 is received though the slot 20 in the elongated hollow pole 12 and extends outwardly of the open second end 16 thereof and wrapped under the bridge rail 100 and triangular support brace 24 to be coupled with the securement buckle 46 in front of the second side 28 of the triangular support brace 24. FIG. 4 illustrates a pair of threaded screws 48 extending through the intermediate extent 44 of the strap 38 and through the intermediate extent 18 of the lower surface of the elongated hollow pole 12 for securement to the first side 26 of the triangular support brace 24. The intermediate extent 44 of the strap 38 has a securement button 50 secured thereto at a position outwardly of the open second end 16 of the elongated hollow pole 12.

Lastly, an accessory pouch 54 is provided. The accessory pouch 54 is adapted to be secured to the securement button 50 of the strap 38. The accessory pouch 54 is provided to hold various miscellaneous items associated with fishing therein to be immediately accessible to the user. The accessory pouch 54 includes an upwardly extending strip 56 having a matching button 58 corresponding to the securement button 50. Also, the accessory pouch 54 has a pocket 60 with a clasping cover 62.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A fishing rod holder for holding a fishing rod in place against a bridge rail comprising, in combination:

an elongated hollow pole having an open first end, an open second end, and an intermediate extent therebetween, the intermediate extent having a slot formed through a tower surface thereof;

a triangular support brace having a first side, a second side, and a third side; the first side having an elongated recess formed therein, the elongated recess dimensioned to receive the elongated hollow pole therein, the second side having an obtuse recess formed therein, the obtuse recess having a rubber liner secured therein, the second side positionable atop a bridge rail for securement thereto;

a strap having a first end, a second end, and an intermediate extent therebetween, the second end having a securement buckle secured thereto, the first end being received through the slot in the elongated hollow pole and extending outwardly of the open second end thereof and wrapped under the bridge rail and triangular support brace to be coupled with the securement buckle in front of the second side of the triangular support brace, a pair of threaded screws extend through the intermediate extent of the strap and through the intermediate extent of the lower surface of the elongated hollow pole for securement to the first side of the triangular support brace, the intermediate extent of the strap having a securement button secured thereto at a position outwardly of the open second end of the elongated hollow pole;

an accessory pouch adapted to be secured to the securement button of the strap.

2. A fishing rod holder comprising, in combination:

an elongated hollow pole having a slot formed through a lower surface thereof;

a triangular support brace having an elongated recess formed therein dimensioned to receive the elongated hollow pole therein, the triangular support brace positionable atop a bridge rail for securement thereto;

a strap received through the slot in the elongated hollow pole and extending outwardly of an open end thereof and wrapped under the bridge rail and triangular support brace to be coupled with a securement buckle on a distal end of the strap.

3. The holder as set forth in claim 2 wherein a lower surface of the triangular support brace having an obtuse recess formed therein, the obtuse recess having a rubber liner secured therein.

4. The holder as set forth in claim 2 and further including a pair of threaded screws extending through an intermediate extent of the strap and through an intermediate extent of the lower surface of the elongated hollow pole for securement to the triangular support brace.

5. The holder as set forth in claim 2 and further including a securement button secured to the intermediate extent of the strap at a position outwardly of the open end of the elongated hollow pole, and an accessory pouch adapted to be secured to the securement button of the strap.

* * * * *